(12) United States Patent
Akaoui

(10) Patent No.: US 10,936,835 B2
(45) Date of Patent: *Mar. 2, 2021

(54) SYSTEM AND A METHOD FOR DETECTING INFORMATION OF ASSETS STORED IN COMMUNICATION TAGS

(71) Applicant: Danny Akaoui, Sarasota, FL (US)

(72) Inventor: Danny Akaoui, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/818,829

(22) Filed: Mar. 13, 2020

(65) Prior Publication Data

US 2020/0210660 A1 Jul. 2, 2020

Related U.S. Application Data

(63) Continuation-in-part of application No. 16/514,955, filed on Jul. 17, 2019, now Pat. No. 10,664,672.
(Continued)

(51) Int. Cl.
*H04W 4/029* (2018.01)
*H04W 4/35* (2018.01)
(Continued)

(52) U.S. Cl.
CPC ..... *G06K 7/10386* (2013.01); *G06K 7/10227* (2013.01); *H04N 7/181* (2013.01); *H04W 4/029* (2018.02); *H04W 4/35* (2018.02)

(58) Field of Classification Search
CPC .................................................. G08B 13/2462
See application file for complete search history.

(56) References Cited

U.S. PATENT DOCUMENTS

| 2012/0161967 A1* | 6/2012 | Stern | G06Q 10/087 |
| | | | 340/572.1 |
| 2014/0035724 A1* | 2/2014 | Rothschild | G01S 13/878 |
| | | | 340/8.1 |
| 2014/0266615 A1* | 9/2014 | Ouyang | G01S 5/0252 |
| | | | 340/10.1 |

* cited by examiner

*Primary Examiner* — Joseph H Feild
*Assistant Examiner* — Pameshanand Mahase
(74) *Attorney, Agent, or Firm* — Wilson, Elser, Moskowitz, Edelman & Dicker LLP

(57) ABSTRACT

Disclosed is a system for detecting information of assets stored in communication tags and communicating assets information over a communication network. The system includes a bi-directional communication reader, a server, a GPS unit, a camera, a communication module, a relay switch, a battery, and an IR Engine. The server stores asset information using a software application. The software application includes a front end application module for configuration, an event module, a jitter control module, a back end application module, a communication module, a GPS communication module, a relay communication module, a motion detector communication module, a reader control module, a camera communication module, and an IR communication module. Further, an unlimited number of modules can be added for example extended storage, LCD, and flash. The event module reads the asset information from the database and alerts the user of an event. The communication module receives processed assets information from the communication tags via the bi-directional communication reader from the specific antenna. Further, the communication module communicates the processed assets information over the communication network via a proprietary protocol.

20 Claims, 12 Drawing Sheets

Related U.S. Application Data which is a continuation-in-part of application No. 16/034,284, filed on Jul. 12, 2018, now Pat. No. 10,403,109.

(60) Provisional application No. 62/532,315, filed on Jul. 13, 2017.

(51) Int. Cl.
*G08B 25/10* (2006.01)
*H04Q 9/00* (2006.01)
*G06K 7/10* (2006.01)
*H04N 7/18* (2006.01)

Reader Settings

| Field | Value |
|---|---|
| Region: ? | North America |
| Max Time Loc Tag: ? | 10000 |
| Rx Antenna: ? | 2 |
| Tx Antenna: ? | 2 |
| Ant Group Enable: ? | no |
| Max Time Read Tag: ? | 300 |
| Discovery Attempts: ? | 3 |
| Protocol: ? | proto |
| Read Mode: ? | S1 |
| Monitor Time: ? | 5 |
| Search Flag: ? | 1 |
| Tag address: ? | 0 |
| Tag Select ID: ? | 1 |
| Tag Meta Data: ? | RSSI (2-3) |
| Select Data: ? | 0 |
| PC Word2: ? | 3000 |
| PC Word1: ? | 3000 |
| Apply ? | Apply |

FIG. 4

Create Table Entries

Table Name: ? | readerWareHouse
Column1: ? | price
Column2: ? | expirationDate
Column3: ? | vendor
Column4: ? | contactInfo
Column5: ? | contactName
Submit: ? | Save Entries

FIG. 7

Table readerWareHouse — 802

| tagnumb | tagname | detectstart | alert | access |
|---|---|---|---|---|
| Tag Name | Tag Name | | | |
| e2-00-90-33-11-06-00-66-15-70-6f-b1 | sportsandhealth | NORM | NULL | 2017-02-08 23:10:47 |
| e2-00-90-33-11-06-00-66-16-50-66-f5 | sandhealthcards | NORM | NULL | 2017-02-08 23:10:47 |
| e2-00-90-33-11-06-00-66-10-60-a7-f6 | boacheck | NORM | NULL | 2017-02-08 23:10:47 |

FIG. 8

Filter Search Entries

| Entry: ? | tagname |
| Value: ? | sportsandhealth |
| Filter Enable: ? | true |
| Submit: ? | Update Filter |

Value
- tagnumb
  Enter the tag number with '' as it appears in the database
- tagname
  Enter the tag name as it appears in the database
- detectstat
  PRES or MISS

FIG. 9

Alerts:

Event Monitor St: ? [on]

Enable Alerts: ? [yes]

| tagname | timeinterval | alertvalue | eventstart | alert |
|---|---|---|---|---|
| sportsandhealth | 20 | MISS | 2017-02-10 11:34:13 | start |
| sandhealthcards | 20 | MISS | 2017-02-10 11:34:13 | start |
| boacheck | 20 | MISS | 2017-02-10 11:34:13 | start |

SYSTEM AND A METHOD FOR DETECTING INFORMATION OF ASSETS STORED IN COMMUNICATION TAGS

CROSS-REFERENCE TO RELATED PATENT APPLICATIONS

The present application is a continuation-in-part of U.S. application Ser. No. 16/514,955 filed on Jul. 17, 2019, which is a continuation-in-part of U.S. application Ser. No. 16/034,284 filed on Jul. 12, 2018, entitled "A SYSTEM AND A METHOD FOR DETECTING INFORMATION OF ASSETS STORED IN COMMUNICATION TAGS" which claims priority to U.S. Provisional Patent Application Ser. No. 62/532,315, filed Jul. 13, 2017.

BACKGROUND OF THE INVENTION

1. Field of the Invention

Embodiments relate to radio frequency identification (RFID) readers and servers or readers only and the use of RFID tag information in a complete system differentiating from other RFID readers by integrating swiftly into the user's current system with the use of open source databases.

2. Description of the Related Art

RFID is a wireless, non-contact system that uses radio-frequency electromagnetic fields to transfer data from a tag attached to an object for identification and tracking. Other RFID systems combine a RFID reader, RFID tags and a computer software and device from different manufacturers requiring complex integration.

Managing inventories of Radio Frequency Identification (RFID) tagged articles is a common practice in the industry. Numerous commercial applications exist for managing RFID-tagged inventories either in a warehouse type location or in a specific storage cabinet.

Typically, the RFID tags are read by an RFID reader when articles enter or exit the warehouse or cabinet, or the warehouse or cabinet are sampled at certain time points in order to determine the inventory levels or specific conditions of the tagged-articles.

For example, an RFID tag may contain information about the expiration date of the article, so it could be interesting to read all RFID tags in order to determine the expected shelf life of each article. In prior art, the RFID reader is a stand-alone reader that reads the RFID tag on the object and communicates data to other computers and does not hold the data and processes within the RFID reader. The prior art does not communicate through a proprietary protocol.

Further, the current applications failed to provide a back end application that instructs the reader or readers to read from a specific antenna. Moreover, current applications do not adequately address RF interference when multiple readers are present. Therefore, there is a need of a system that allows the RFID reader to support an unlimited number of antennas to be able to read an unlimited number of assets through large areas using multiple antennas and multiple readers and improve the certainty that the tag the antenna reads is actually the asset the antenna saw and not some other tag picked up by the antenna. The system should include a front end, a back end, a reader and a monitoring application. The back-end application in the configuration server reads the data from the RFID reader using a proprietary protocol and stores the data into an open source database located in the LAN or in the cloud. Furthermore, the back end application allows each reader to activate one antenna one at a time or a reader or readers to prevent any interference.

SUMMARY OF THE INVENTION

An object of the present invention is to provide a system for detecting information of assets located throughout large or small areas stored in communication tags and communicating assets information over a communication network using multiple, even more than 1,000 antennas, and multiple readers, which could be more than 1,000 readers. The system includes a bi-directional communication reader, a server, an optional GPS unit to capture location, an optional relay switch to turn on and off external devices, an optional communication unit for WiFi and cellular, an optional battery for power and an optional camera unit to capture images based on events. The system is a fixed reader. The system can be a handheld with a different configuration of the battery for power. It is therefore an object of the present invention to provide a system for detecting information of assets that may be configured to include optionally one or more of the following: a GPS unit, a communication unit, a battery operably connected to the server, a camera, or a relay switch, and an Image Recognition Engine including any combinations thereof. The system may include one to five of the options connected to the server.

Here, a configuration server controls the passive RFID reader via the back-end application running on the server. The configuration server via the back-end application instructs the RFID reader to receive RFID tag data information from a specific antenna installed on the reader. The back-end application in the configuration server is able to configure and control an unlimited number of RFID antennas/readers while maintaining no interference. The bi-directional communication reader has at least one antenna with associated signal strength and antenna number. The bi-directional communication reader processes the received assets information from the communication tags.

The server includes a database for storing asset information and further the server communicates with the bi-directional communication reader. Further, the database can be located on a different server locally in the LAN or in the cloud. The server stores asset information using a software application. The software application includes a front end application module, an event module, a back end application module, a communication module, and the option of a GPS communication module, and/or a camera communication module, and/or a motion detector communication module and/or a relay communication module and/or a jitter control module and/or an IR communication module. Additional modules can be added to the software stack.

The front end application module receives at least one operational mode from a user, wherein the operational mode relates to setting of the operation of the bi-directional communication reader. The event module reads the asset information from the database and alerts the user if a certain event occurs. The event module is configured by the front end application module to set a specific rule that triggers an event.

The back end application module is configured via the front end application module. Further, the back end application module configures the bi-directional communication reader, as per the selected operational mode, to process the required information from the communication tags read by the bi-directional communication reader.

The communication module receives processed assets information from the communication tags via the bi-directional communication reader from the specific antenna. Further, the communication module communicates the processed assets information over the communication network via a proprietary protocol.

Another object of the present invention is to provide a system wherein the software application further includes an event module configured in the front end application module for setting up an alert. Further, the event module is configured in the front end application module to send alert messages of missing assets as per the selected alert setting over the communication network.

Another object of the present invention is to provide the option of a relay switch operably connected to the server. The software application further includes a relay communication module to receive events from the event module and operates the relay switch. The front end application module configures the relay and through the relay communication module checks the status of the relay switch.

Another object of the present invention is to provide the system with an option of a camera operably connected to the server to generate visual data. The software application includes a camera communication module to receive a trigger event from the camera. Once a trigger event from the camera is received, the camera communication module combines image frames from the camera into a movie file. The movie file is stored by date and time onto the storage device on the server. The movie file date and time is then associated with an event to provide visual identification of an event to the user.

Another object of the present invention is to provide the system with an option of a camera operably connected to the server to generate an event when movement occurs. The software application includes a camera motion detector module and a camera communication module. The motion detector module generates a series of images each and every time motion is detected. Once, images are generated by the camera motion detector module, the camera communication module starts the reader for a specific amount of time. Starting and stopping the reader at specific amounts of time reduces RF interference when multiple readers are present.

Another object of the present invention is to provide the system with an option of an image Recognition module, which communicates with the Image Recognition server to retrieve an attribute of an object in an image or determine the attributes of an object in the image. The camera motion detector module generates a series of images each and every time motion is detected. The camera communication module stores these images by date and time into the database. The Image Recognition module associates the tag stored in the database by date and time plus or minus a user selected few seconds to associate the image with the tag. Afterwards, the Image Recognition module sends a request to the Image Recognition Engine to get the attribute of the object based on the tag number. Once the Image Recognition Server responds with the attribute information, the attribute of the object in an image is stored in the database along the other information based on the tag number.

Another object of the present invention is to provide the system with an option of an Image Recognition module, which communicates with an Image Recognition Engine to determine if a new object matches the expected object based on the current image. The camera motion detector module generates a series of images each and every time motion is detected. The camera communication module stores these new images by date and time into the database. The Image Recognition module associates the tag stored in the database by date and time plus or minus a user selected few seconds to associate the image with the tag. Afterwards, the Image Recognition module retrieves the current and new image from the database and sends a request to the Image Recognition Engine to get a match or no match result based on the tag number. Once the Image Recognition Engine responds with a match or no match result, the match or no match is stored in the database based on the tag ID.

Another object of the present invention is to provide the option of jitter capabilities to prevent assets from being reported improperly when an asset is physically located in an invalid area of the RF beam. Once an asset is located in an invalid area of the RF beam during transition, the asset starts reporting its state improperly. The jitter control algorithm filters these events to prevent invalid information from being stored in the database.

These and other objects, features and advantages of the invention will become more fully apparent in the following detailed description, taken in conjunction with the accompanying drawings.

BRIEF DESCRIPTION OF DRAWINGS

FIG. 4 illustrates a screenshot showing the front end application module of reader settings of antenna;

FIG. 7 illustrates a screenshot showing the front end application module of table entries meaning the tables entries may be status or user setting;

FIG. 8 illustrates a screenshot showing the front end application module of table reader entries;

FIG. 9 illustrates a screenshot showing the front end application module of filter search setting in accordance with an exemplary embodiment of the present invention; and FIG. 10 illustrates a screenshot showing the front end application module of the event module status in accordance with an exemplary embodiment of the present invention.

DETAILED DESCRIPTION OF DRAWINGS

Figure 1:
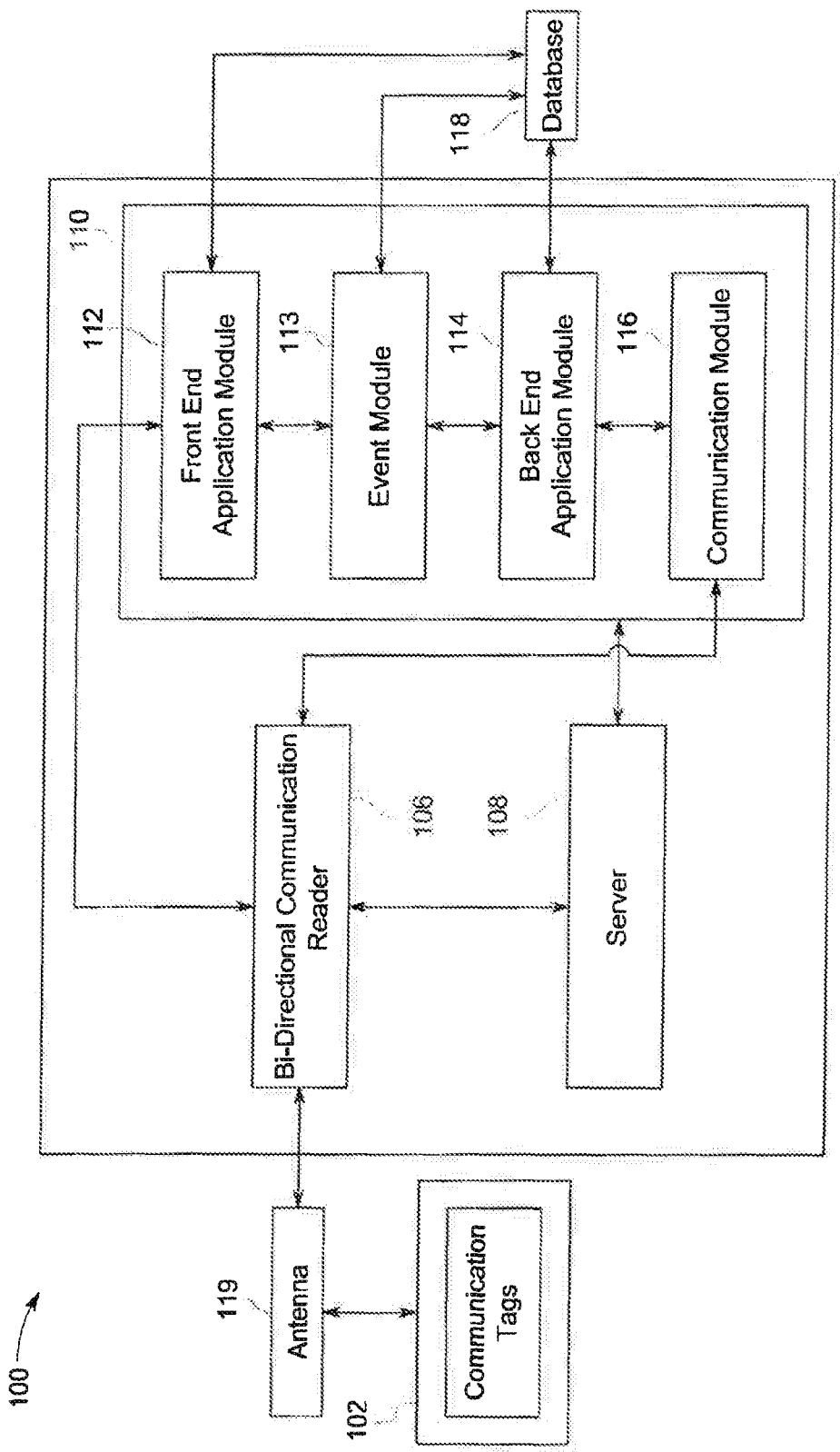
FIG. 1 illustrates a block diagram of a system for detecting information of assets stored in communication tags and communicating the assets information over a communication network.

While this technology is illustrated and described in a preferred embodiment, a system for detecting information of assets stored in communication tags and communicating the assets information over a communication network may be produced and described in many different configurations, forms and various methods, without deviating from the scope of the present invention. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a block diagram of a system 100 for detecting information of assets 102 stored in communication tags 104 and communicating the assets information over a communication network. The system 100 includes a bi-directional communication reader 106 and a server 108.

In a preferred embodiment of the present invention, the communication tag 104 and the bi-directional communication reader 106 are RFID based. However, it would be readily apparent to those skilled in the art that various types of the communication tag 104 and the bi-directional communication reader 106 may be envisioned without deviating from the scope of the present invention. The antenna 119 receives and communicates with the communication tags 104.

The bi-directional communication reader 106 has at least one antenna. The bi-directional communication reader 106 processes the received assets information from the communication tags 104. The server 108 communicates with the bi-directional communication reader 106. The function of antenna 119 is explained in detail in conjunction with FIG. 4 of the present invention.

The bi-directional communication reader 106 communicates with the assets 102 according to the ISO 18000-6C Gen 2 or future protocol. The assets operate according to the ISO 18000-6C Gen 2 protocol and have five operational modes. The operational modes are explained in detail in conjunction with FIG. 3 of the present invention.

The bi-directional communication reader 106 supports up to two monostatic antennas, which cover a RFID tag read distance that is over 30 feet and further distances. The bi-directional communication reader 106 has five different operational modes. Further, the reader 106 features brown out recovery and flash redundancy support with live upgrade capability and requires no user programming.

The server 108 stores and processes a software application 110. The software application 110 includes a front end application module 112, an event module 113, a back end application module 114, and a communication module 116. The front end application module 112 receives at least one operational mode from a user. The server may be located either locally or in the cloud. The operational mode relates to the setting of the operation of bi-directional communication reader 106. The operational modes are explained in detail in conjunction with FIG. 3 of the present invention.

The event module 113 reads the asset information from the database 118 and alerts the user if a certain event occurs. The event module is configured by the front end application module to set a specific rule that triggers an event. The scalability to support an unlimited number of antennas is achieve by repeating the modules 113, 114 and 116 to communicate with each 106. The event module 113 is explained in detail in conjunction with FIG. 10 of the present invention.

Examples of an event include alerting the user when an asset is present or missing or if an asset is about to expire. Additional examples of events include, but are not limited to, finding assets in a warehouse, tracking wandering patients in a hospital, tracking people in event management, inventory management etc. The examples are explained in detail from paragraph 70 of the present invention.

The back end application module 114 is configured via the front end application module 112. Further, the back end application module 114 configures the bi-directional communication reader 106 as per the selected operational mode to process the required information from the communication tags 104.

The communication module 116 receives processed asset information from the communication tags 104 via the bi-directional communication reader 106 from a specific antenna. Further, the communication module 116 communicates the processed asset information over the communication network. Examples of the communication network include, but are not limited to, TCP/IP over internet, LAN, Bluetooth, WiFi and other similar communication modes.

In another preferred embodiment of the present invention, the communication tags are created and customizable. The communication tags may be customized with customer specific information and company specific information to make them accessible for the specific customer in their bi-directional communication reader.

Figure 2:
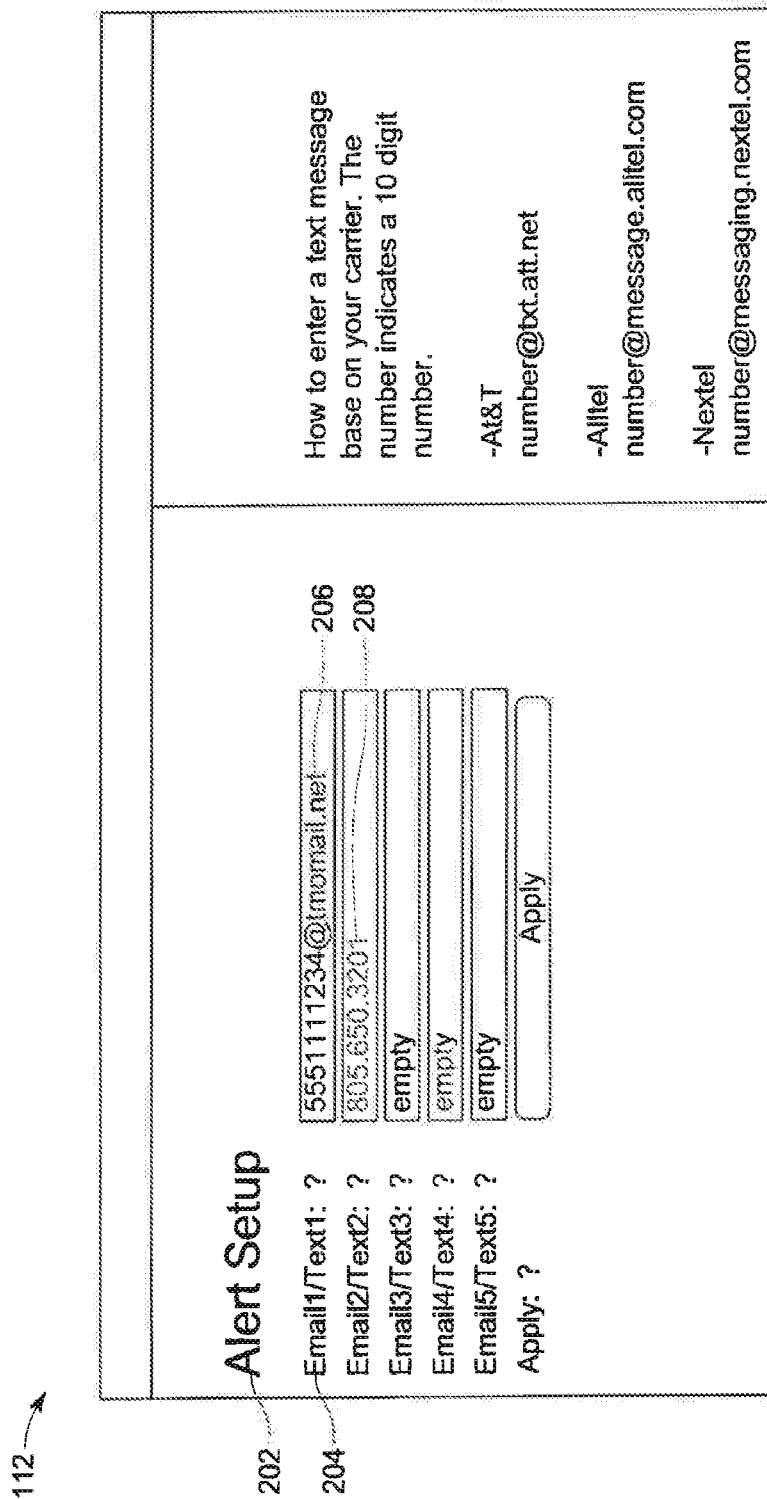
FIG. 2 illustrates a screenshot showing a front end application module for setting up an alert.

FIG. 2 illustrates a screenshot showing the front end application module 112 for setting up an event module 113 using the alert setup 202. The event module 113 is configured in the front end application module 112 to setup the alert.

Further, the event module 113 using the alert setup 202 is configured by the front end application module to send alert messages of missing assets as per the selected alert setting over the communication network based on asset information read from the database 118. The asset information in the database 118 is stored by the back end application module 114. As shown in FIG. 2, the user may enter details via the front end application related to either an email or text 204 to allow the event module to send text or email alerts. The details contain the email ID 206 or the phone number 208.

Generally, the event module 113 using the alert setup 202 reads the assets that are located in the database 118 and compares the time of the last read with the current time. If the asset is missing for a period of time, then a text or email message is sent to the user(s) from the event module depending on the text and/or email message setup.

Another alert is sent again based on the recurring time that is set by the front end application and configuration by the user. The user may set up different types of alerts based on user specified entries. Alerts may be text or email or other communications forms.

The monitoring mode (shown in FIG. 3) is set by the front end application using the mode setting in 302 to allow the back end application to communicate with the bi-directional communication reader.

Figure 3:
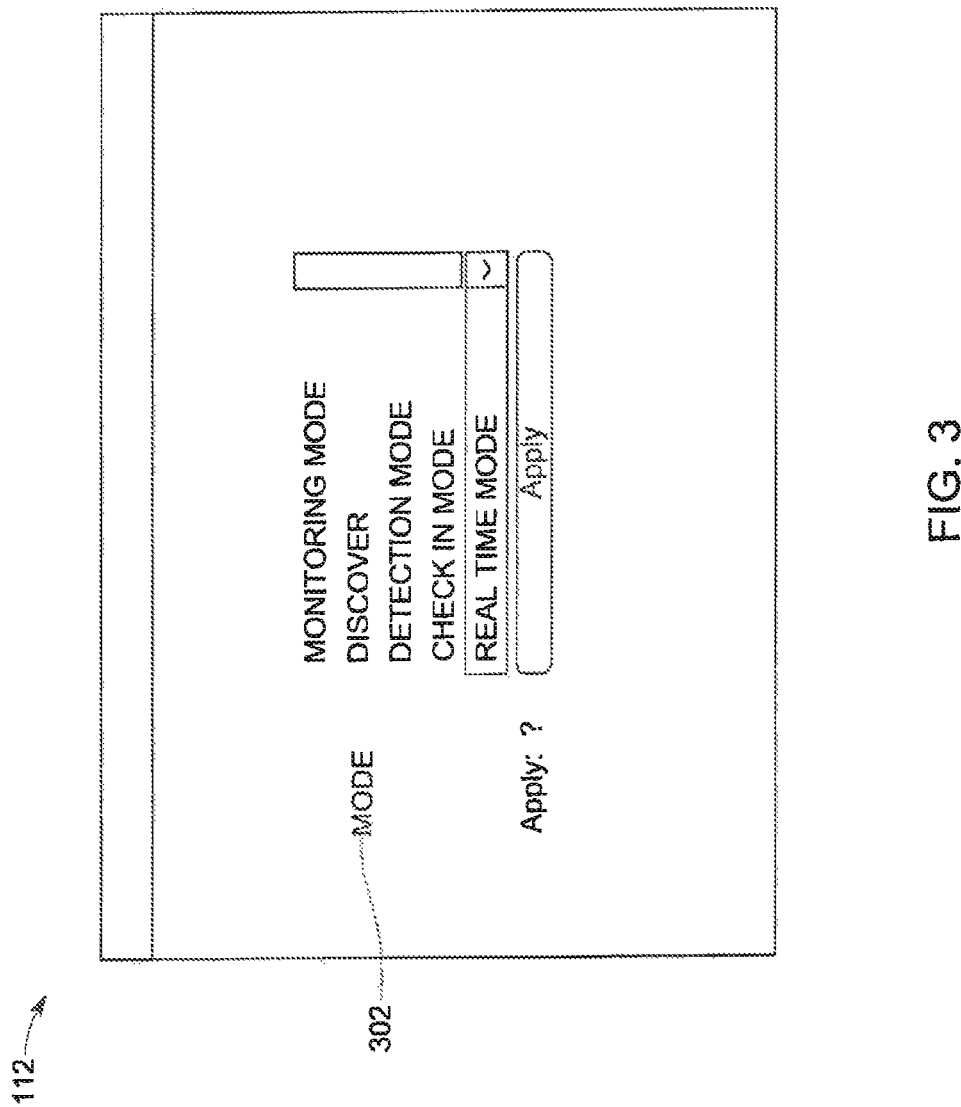
FIG. 3 illustrates a screenshot showing the front end application module for selecting a communication mode.

FIG. 3 illustrates a screenshot showing the front end application module 112 for selecting an operational mode 302 in accordance with a preferred embodiment of the present invention. The front end application module 112 receives at least one operational mode 302 from a user. Examples of the mode 302 include but are not limited to monitoring mode, discovery mode, detection mode, check-in mode and real-time mode.

The monitoring mode allows the user to set up priorities for monitoring discovery of assets through the front end application module. Examples of the priorities for discovery of assets are low priority, medium priority and high priority.

The low priority instructs the back end application module to attempt to detect the asset last. The medium priority instructs the back end application to read the asset as a middle priority. The high priority instructs the back end application to read the asset first or beginning of the cycle.

Further, the monitoring mode, configured in the back end application module, reads the communication tags one at a time based on the assets priority. Furthermore, the monitoring mode compares and confirms the presence of assets in the server. The assets are located in the vicinity of the antenna.

The discovery mode is configured in the back end application module to read the assets information received from the bi-directional communication reader. Further, the discovery mode configured in the front end application module allows the user to read all assets simultaneously and only update the assets with current assets that are located in the database or server. The discovery mode allows the reader to detect the current tags.

In a preferred embodiment of the present invention, if the asset is located in the database, a flag of present is added next to the asset. Further, the return signal strength is updated, the antenna number is updated and the latest time/date of discovery of the asset monitored is updated. The back-end application repeats the process an infinite number of times until the front-end application 112 tells the back-end application to stop detecting. The start and stop setting is explained in detail in conjunction with FIG. 5 of the present invention.

The detection mode, configured in the front end application module, informs the back end application module to read and store new assets in the database if the assets do not currently reside in the database. Generally, in the detection mode, if the assets are located in the database, a flag of present is added next to the asset and the time/date of detection is added into the database. The advantage of the detection mode is it allows the user to add new assets to a current database and not override assets that are already in the database.

If the assets are not located in the database and are discovered, then a new asset is added to the database with the time/date of detection. The back-end application module repeats the process an infinite number of times until the front application module is configured by the user to stop detection mode.

The check-in mode provides status of the assets in the database over the communication network. The check-in mode includes at least one of check-in status to mark the entry of the asset and the check-out status to mark the exit of the asset from the database.

The real time mode is configured in the front end application module and allows the user to detect the presence of the assets in the database at a fast rate. Further, the real time mode configured in the back end application module sets the number of antennas and further detects if any asset is missing based on the time when the asset is last detected.

FIG. 4 illustrates a screenshot showing of the front end application module 112 of reader settings of antenna. The front end application 112 allows the user to provide a range of power and communicates with the assets at different frequencies and ranges. Further, any mode or the real-time mode sets the antenna to locate assets depending on the number of antennas.

In a preferred embodiment, the antennas may either be bistatic or monostatic. A monostatic antenna is able to transmit and receive RF signals to and from the items. As shown in FIG. 4 in an exemplary embodiment of the present invention, the user is allowed to set up the antenna of the reader. The user is able to add information associated with setting up the antenna such as:
  Select NA for North America or EU for the European region
  RX Antenna: 2
    Select 2 if Antenna is connected to Antenna 2
    Select 1 if Antenna is connected to Antenna 1
  TX Antenna: 2
    Select 2 if Antenna is connected to Antenna 2
    Select 1 if Antenna is connected to Antenna 1
  Ant Group Enable: no then click Apply
    Select yes if both Antenna are enabled With the communication mode, the bi-directional communication reader communicates at different frequencies and reads the item numbers from a specific antenna and sends the data back to the configuration server in the back-end application module via the communication module 116 using the proprietary RFR protocol.

The RFR protocol is used by the communication module 116 to allow the backend software to control the reader and set the specific control settings to enable the backend protocol to read the tags from the reader based on important settings such as protocol configuration setting, the region, the timeout settings, check whether the reader is alive, the version of the reader as well as the number of tags that are read. Based on the communication mode, the back-end configures the reader using the communication module 116 that uses the handshake mode proprietary RFR protocol. The reader operates in real time as opposed to archived in a configuration file.

Figure 5:
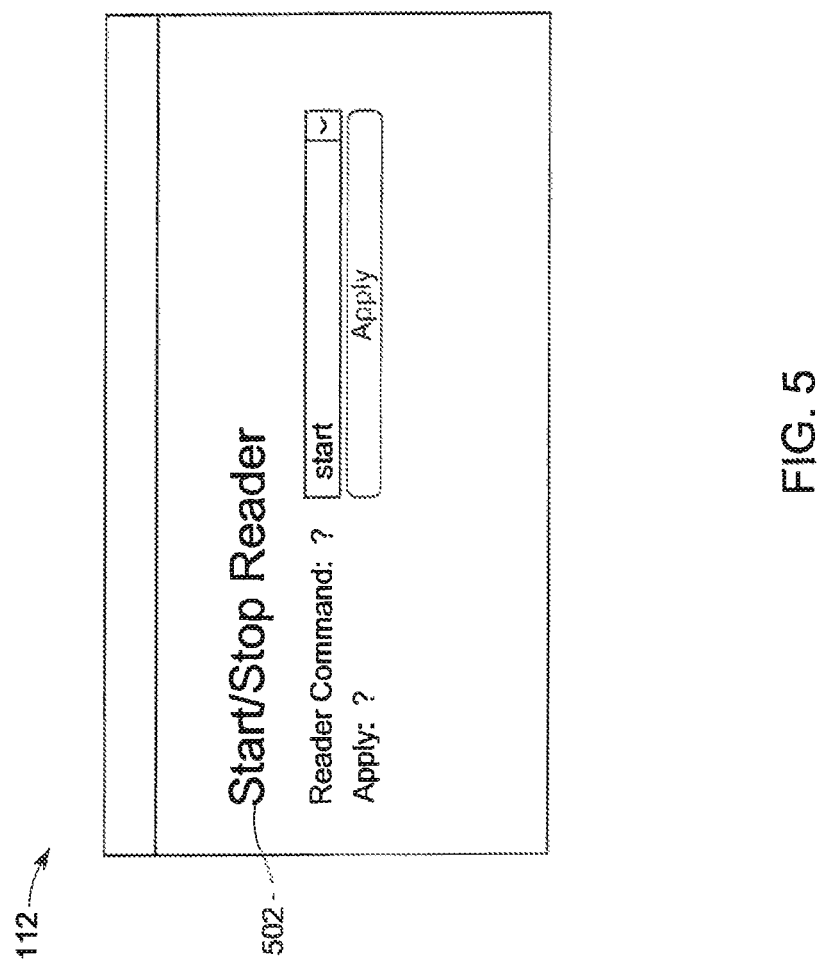
FIG. 5 illustrates a screenshot showing the front end application module of start/stop setting.

FIG. 5 illustrates a screenshot showing the front end application module 112 of start/stop setting 502. The front end application allows the user to select either start or stop setting, to control the operation of the bi-directional communication reader. The start or stop setting results in stopping or starting of the bi-directional communication reader.

Figure 6:
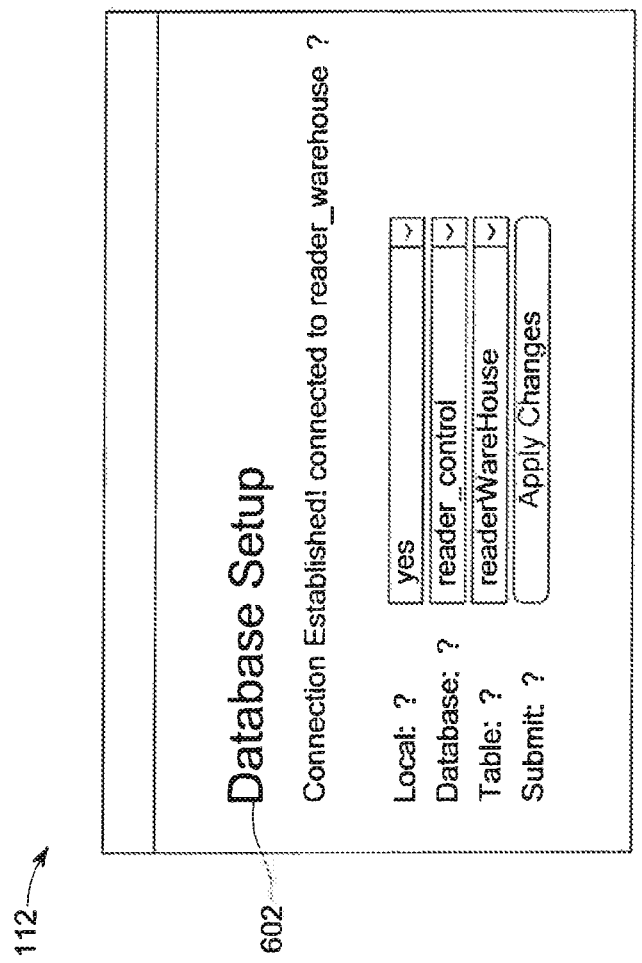
FIG. 6 illustrates a screenshot showing the front end application module for setting up of a database.

FIG. 6 illustrates a screenshot showing the front end application module 112 for setting up of a database 118 set up 602. In another preferred embodiment of the present invention, the software application further includes a database setup 602 to allow user to set up the database 118 for secure access.

The database 118 setup may be setup from the front end application module by providing a secure database username, password, and network information. The database, for example, may be setup by applying the following steps:
  Keyword: dbsetup
  Local: yes
    If you are using an external Database, Select no.
  Database: Select reader_control (database name) then Click Apply
  Table: Select readerWareHouse then Click Apply
  A connection established connected to readerWarehouse is displayed. Congratulations, you are now connected to the database reader_control and table readerWarehouse! or similar language.

FIG. 7 illustrates a screenshot showing the front end application module 112 of a table 702. The front end application further includes a table setting 702 for allowing the user to create a table based on user entries in the database 118.

For exemplary purposes as shown in FIG. 7 of the present invention, the following are the table entries for an inventory/Warehouse:
  Table Name: readerWareHouse
  Column1: price
  Column2: expirationDate Column 3: vendor
Column4: contatinfo
Column5: contactName
Submit: Save Entries FIG. 8 illustrates a screenshot showing the front end application module 112 of table reader entries 802 from the database 118. The front end application further includes a table reader entries 802 for allowing the user to access the entries indicating the status of communication tags in the vicinity of the antenna 119.

In an exemplary embodiment of the present invention, the following instructions indicate the presence of assets in the table reader 802.

Keyword: access
Table Entries
   Table reader_warehouse: Indicates the current table
   Tagnumb: Tag number
   Tagname: Tag name
   Status: Norm—Indicates that the status of the tag is idle
   Alert: NULL—Indicates that the alert is not setup yet
     This is expected, since we have not setup the alerts yet.
   Time: Indicates the time of last detection.
     The values are irrelevant, since the reader is not running yet FIG. 9 illustrates a screenshot showing the front end application module 112 of filter search setting 902. In another preferred embodiment of the present invention, the filter search setting 902 allows the user to setup a filter for display purposes of the database entries.

In an exemplary embodiment of the present invention, the following instructions indicate the operation of the filter search setting 902.

Keyword: dbfilter
The table filter menu allows you to filter entries within the database based on your entry.
Entry: Select an entry based on the definition below:
   tagnumb: Enter the tag number with '-' as it appears in the database
   tagname: Enter the tag name as it appears in the database
   detectstat: PRES or MISS
   execpriority: NORM, MED, or HIGH
   execstat: NORM, OK
   cmd: READ
   rssi: 0-0xff
   antid: not currently supported
   alert: start or stop
   alertsign: equal, greater, smaller
   alertvalue: PRES, MISS
   alerttype: detectstat
   timeinterval: depending on the value set (5..)
   eventstart: start time yyyy-mm-day hh:mm:sec
   access: start time yyyy-mm-day hh:mm:sec
Value: Enter a value based on the entries above.
Filter Enable: Select true to enable filter
Example:
   Entry: tagname
   Value: sportsandhealth
   Filter Enable: true FIG. 10 illustrates a screenshot showing the front end application module 112 to show the status of the event module 113 in accordance with an exemplary embodiment of the present invention. The event module 113 allows the user to obtain the status of the event.

For exemplary purposes, the instructions for checking on the status of the event module 113 are as follows:

Keyword: areview
Event Monitor St: yes
   The Event Monitor needs to be enabled to receive alerts.
Enable Alerts: yes
   The Alerts need to be enabled to receive alerts.
Congratulations! You can now receive alerts when a tag is missing

EXAMPLES

Non-limiting, exemplary embodiments of the present invention are as follows:

Example 1: Warehouse—Finding Metal Parts

The present invention may be installed in an industrial workroom to allow users to find the location of metal parts, parts containers, and work orders, which accompany each part located in the workroom. Metal parts to track vary in size from a few inches to a few feet with smaller parts assigned in plastic bins. A work order accompanies each part or container.

In the warehouse, there may be 30 work zones to cover with each zone roughly 12 feet×12 feet in dimension. The configuration of desks or workspaces within each zone is not set as the furniture or workbenches may be set up differently depending on the project being worked on at the time.

Each asset may be tagged by an RFID UHF 18000-6C Gen2 tag specifically designed for the specific end-user. As configured and described herein, the present invention provides the user with location information of any asset within a zone in real time. The present invention may store the data information in the cloud using cloud services or on premise using a database server.

The present invention provides alerts to the customer via text or e-mail based on the customer's settings. The antennas may be located on the ceiling or on a desk. The readers may be powered using POE 24V switches or a power supply.

Example 2: Wandering Patient in a Hospital, Rehab Facility or Assisted Care Center In this example, the goal is to develop a solution that informs the staff when patients access the hallways at any time during the day or night or leave a facility.

Each patient may be fitted with an ISO-18000-6C Gen 2 tag around their neck or other comparable location.

As configured and described herein, the present invention detects patients who access the hallway. The hallways may contain one or more antennas. The readers may be connected via a 24V output POE switch. The gateway may be installed in a control room or ceiling with a UPS emergency power supply. As the patient moves throughout the facility, the reader is configured to send the patient location in real time to the gateway.

The information stored may contain the location of each patient. The data stored may also contain the date and time of last detection for each patient in a designated area.

Figure 11:
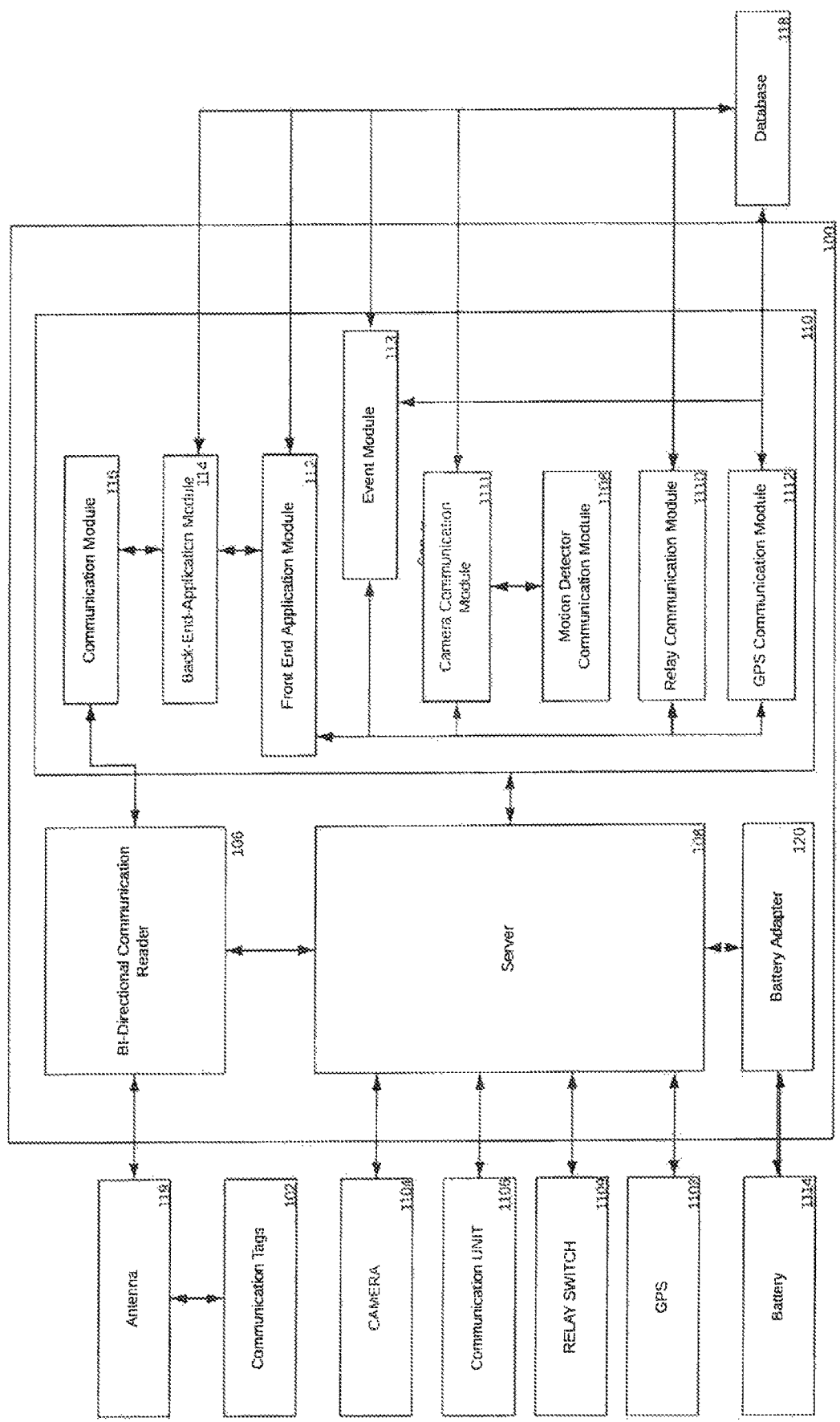
FIG. 11 illustrates another block diagram showing a system for detecting information of assets stored in communication tags and communicating the assets information over a communication network in accordance with another preferred embodiment of the present invention.
Figure 12:
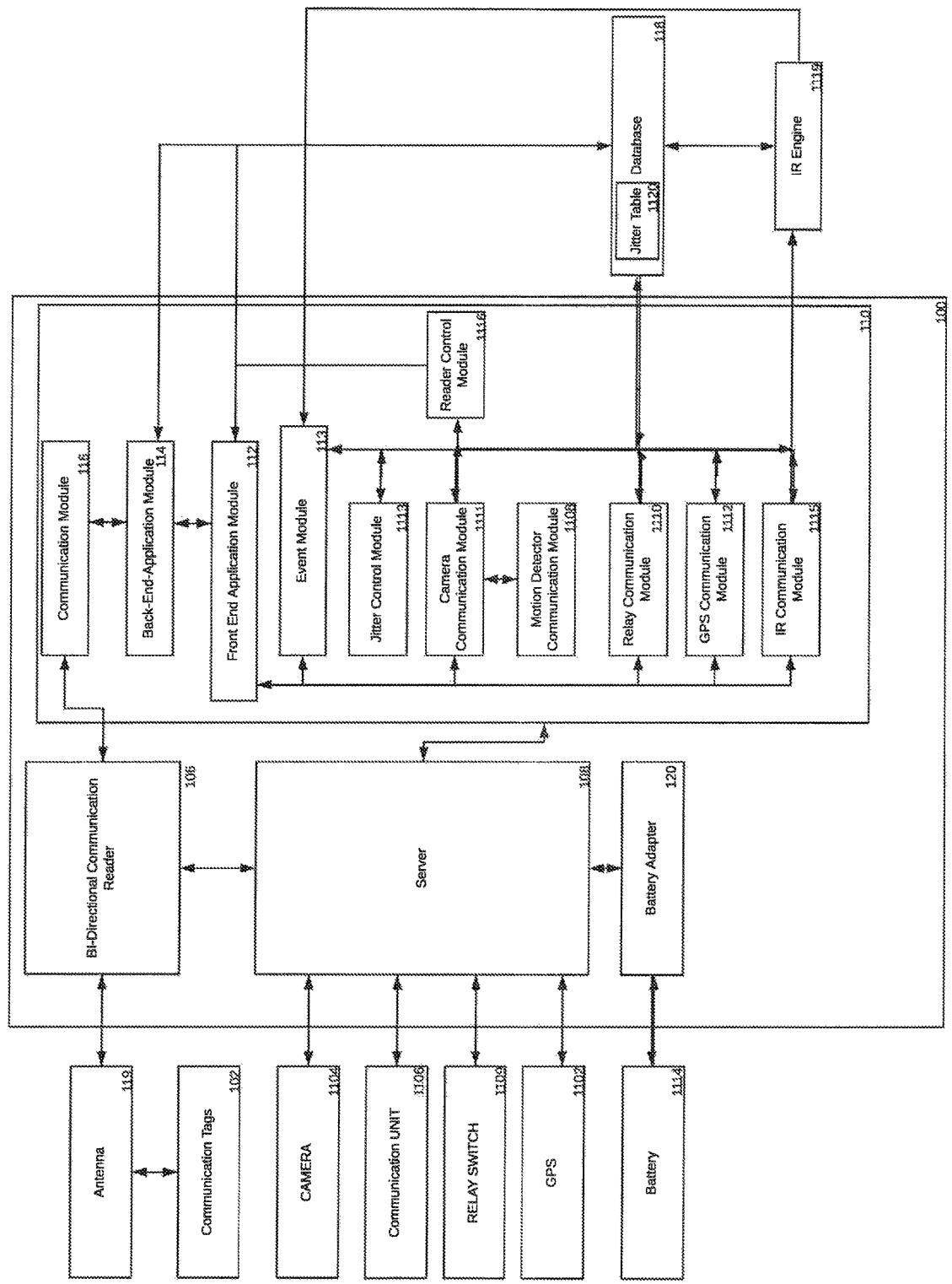
FIG. 12 illustrates a block diagram showing the additional jitter control module, the reader control module, the IR communication module, and the IR Engine in accordance with another preferred embodiment of the present invention.

FIG. 11 illustrates another block diagram showing a system 100 for detecting information of assets stored in communication tags and communicating the assets information over a communication network in accordance with another preferred embodiment of the present invention. The system 100 further includes the options of a global positioning system GPS unit 1102, and/or a camera 1104, and/or a communication/wireless unit 1106, and/or a relay switch 1109, and/or an Image Recognition Engine 1119. The system 100 may be configured to include any combination of the options of a global positioning system GPS unit 1102, a camera 1104, a communication/wireless unit 1106, a relay switch 1109, or an Image Recognition Engine 1119.

The bi-directional communication reader 106 and the server 108 can be in separate enclosures or in one enclosure. It is not obvious to one skilled in the art and in the industry for the bi-directional communication reader 106 and the server 108 to be contained in the same enclosure or same box.

In another preferred embodiment of the present invention, the software application 110 further includes the option of selecting one or more of a GPS communication module 1112, and/or a relay communication module 1110, and/or a camera communication module 1111, and/or a motion detector communication module 1108, and/or a jitter control module 1113, and/or an IR communication module 1115.

The GPS unit 1102 is operably connected to identify location of the server 108 and the bi-directional communication reader 106. Further, the GPS unit 1102 communicates the location of the server 108 and the bi-directional communication reader 106 to the GPS communication module 1112. In some embodiments, the GPS unit 1102 is operably connected to identify either the location of the server 108 or the server and the bi-directional communication reader 106 if located in one enclosure. The GPS communication module 1112 processes the information retrieved from the GPS unit 1102.

In an embodiment of the present invention, the GPS communication module 1112 monitors the status of the GPS unit 1102. The GPS communication module 1112 confirms the location of the reader 106 and the server 108. If the location of the server 108 and the reader 106 is in one enclosure, then the GPS locates both the reader 106 and server 108. The GPS unit 1102 communicates with the GPS communication module 1112 to determine the location of the server 108 and the reader 106 and stores the location, date and time in the database 118. The location, date and time of the system is particularly useful when the system is installed on moving vehicles such as a forklift. In this particular instance, the event module 113 communicates with the GPS communication module 1112 to retrieve the particular GPS coordinates associated with the event based on location, date and time. The location information is associated with a particular event and stored in the database 118. Based on the location, date and time from the GPS communication module 1112, the event module 113 is able to associate an event with the location, date and time of the event.

The front end application 112 configures the GPS unit 1102 via the GPS communication module 1112 by starting, stopping or resetting the GPS unit 1102. The GPS communication module 1112 stores the coordinates in a table based on date and time on a continuous basis. When the event module 113 triggers an event based on date and time, the GPS communication module 1112 retrieves the location information from the GPS table based on date and time, and stores the information in the table.

Examples of GPS unit 1102 include but are not limited to the United States ("U.S.") Navy Navigation Satellite System ("NNSS") (also known as TRANSIT), LORAN, Shoran, Decca, TACAN, the Joint Program Office ("JPO") Global Positioning System known as NAVSTAR etc.

In an embodiment of the present invention, the camera 1104 is operably connected to the server 108. The motion detector module 1108 sends visual data to the server 108 and stores the images on the server 108. Further, the motion detector module 1108 triggers the camera communication module 1111 to start capturing the images for a specific period of time. When the time expires, the camera communication module 1111 combines these images into a movie file, and stores the movie file by date and time into a table in a database, When the event module 113 triggers an event at a particular date and time, the camera communication module 1111 retrieves the image file based on date and time and associates the video file with the event. The user can have a visual representation of the event. Examples of the visual data include but are not limited to images, video, and other similar digital data.

It would be readily apparent to those skilled in the art that various types of camera 1104 may be envisioned without deviating from the scope of the present invention. The front end application 112 configures the camera 1104 via the camera communication module 1111 to set the image retention time, number of frames to be taken per second, number of images to store on the server 108 and checks on the status of the camera 1104.

In some embodiments there may be a communication/wireless unit 1106 operably connected to the server 108. The wireless unit 1106 performs bi-directional communication with the server 108. Examples of the wireless unit 1106 include but not limited to Wi-Fi, Bluetooth, cellular, GSM, CDMA or similar communication networks etc.

In some embodiments, the system 100 may include a battery 1114 and battery adapter 120. The battery adapter 120 is operably connected to the battery 1114 and the server 108. The battery 1114 powers the server 108 and if the reader 106 and server 108 are in one enclosure, then the battery 1114 powers both the reader 106 and server 108. Examples of battery 1114 include but not limited to lead batteries, lithium batteries, primary batteries, second batteries etc. The battery adapter 120 automatically switches between DC power and battery power. The battery adapter 120 automatically switches off the system when the temperature is too high and turns on the heater if the battery is too low. The battery adapter 120 informs the server when running in battery mode. In battery mode the server shuts itself after a specific amount of time to conserve power.

In an embodiment of the present invention, the relay switch 1109 may be operably connected to the server 108. The relay communication module 1110 receives events from the event module 113 and operates the relay switch 1109 by turning on and off power to the relay switch 1109. The relay switch 1109 may be configured for use as an alarm with audible sound, to lock a door or cabinet or other external device, and the like. The front end application 112 sets up the relay configuration and through the relay communication module 1110 checks the status of the relay switch 1109. The database 118 stores the data.

In an embodiment of the present invention, the Image Recognition ("IR") communication module 1115 receives an event from the Event Module 113 indicating that an object within the video or an image needs an attribute associated with the object to be generated. The IR communication module 1115 retrieves the image and tag ID information from the database 118, and issues a requests the Image Recognition Engine (IR Engine) 1119 to generate the attribute of that particular object. The IR Engine 1119 responds to the IR communication Module 1115 with the attribute of the object using the Tag number. The IR communication Module 1115 then stores the attribute of the object based on the tag ID into the database 118. The IR Engine 1119 may be operably connected to the server 108.

In an embodiment of the present invention, the Image Recognition ("IR") communication module 1115 receives an event from the Event Module 113 based on the object tag ID indicating that an object within the video or an image needs to be matched with the current image stored in the database 118. The IR communication module 1115 retrieves the new image and stored image based on the tag ID information from the database 118, and issues a requests to the IR Engine 1119 to generate a match or no match of that particular object. The IR Engine 1119 responds to the IR communication Module 1115 with a match or no match result using the Tag number. The IR communication Module 1115 then stores the match or no match result based on the tag ID into the database 118. The IR Engine 1119 may be operably connected to the server 108.

In an embodiment of the present invention, the jitter control module 1113 reads the last time a Tag ID is updated from the database 118. If the Tag ID access time is less than a specific amount of time set by the user, the entry is not added into a jitter table 1120. If the tag ID access time is larger than a specific amount of time set by the user, the tag ID is added to the jitter table 1120. The jitter table allows the user the ability to get access to prevent the user from accessing data that may be invalid particularly when the data is being reported improperly when an asset is physically located in an invalid area of the RF beam. The jitter control module 1113 filters these events to prevent invalid information from being stored in the jitter table 1120.

In an embodiment of the present invention, the reader control module 1116 starts and stops the reader when a motion is detected by the Camera Control module 1113. When a motion is detected on the camera 1104, the Motion Detector Communication Module 1108 notifies the Camera Communicate Module 1111 that an image is present. The Reader Control Module 1116 communicates with the UI Front End Application Module 112 to start the Back-End application module 114 for a user set amount of time. After a specific amount of time configured by the user, the Reader Control Module 1116 communicates to the Front End Application Module to stop the reader. Starting and stopping the reader at specific amounts of time reduces RF interference when multiple readers are present.

It would be readily apparent to those skilled in the art that various similar types of units/devices and corresponding modules may be operably connected to the server to increase the efficiency of the working of the system without deviating from the scope of the present invention.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A system for detecting information of assets stored in communication tags and communicating the assets information over a communication network, the system comprising:
   a bi-directional communication reader having at least one antenna with associated signal strength and antenna number, wherein the bi-directional communication reader processes the received assets information from the communication tags;
   a server having a database for storing asset information, wherein the server communicates with the bi-directional communication reader and stores the asset information using a software application;
   a camera operably connected to the server to generate visual data, and a wireless communication unit operably connected to the server for providing bi-directional communication with the server; and
   an Image Recognition Engine to determine the attributes of an object within the image, or determine if two images are a match or no match based on the request from the event module;
   wherein the software application comprising:
      a front end application module to receive at least one operational mode from a user, wherein the operational mode relates to the setting of the operation of the bi-directional communication reader;
      an event module for reading the asset information from the database and alerting the user if a certain event occurs, the event module configured by the front end application module to set a specific rule that triggers an event;
      a jitter control module reading the asset information from the database and removing the asset information when assets access a physical area that causes invalid reads;
      an IR communication module to receive events from the event module to request attributes based on an object within the image or a match no match response from the Image Recognition Engine, wherein the attribute or match no match responses are then stored in the database;
      a back end application module configured via the front end application module, wherein the back end application module configures the bi-directional communication reader, as per the selected operational mode, to process the required information from the communication tags read by the bi-directional communication reader;
      a communication module for receiving processed assets information from the communication tags via the bi-directional communication reader having at least one antenna, wherein the communication module communicates the processed assets information over the communication network via a proprietary protocol; and
      at least one member of the group consisting of a camera communication module for processing information from the camera, and a reader control module to start and stop the back-end application module from running when motion is detected from a motion detector communication module;
         wherein the inclusion of the camera communication module and reader control module is determined by the inclusion of the camera unit.

2. The system according to claim 1, wherein the motion detector communication module informs the reader control module that movement is detected, the reader control modules then starts the back-end application module via the front end application module to start transmitting and reading asset information; and wherein the reader control modules then stops the back-end application module via the front-end application module after a certain amount of time set by the user in the front end application module.

3. The system according to claim 1, wherein the event module requests the attribute or a match no match response of an object from the IR communication module based on a video file stored by date and time and event in the database, the IR communication module retrieves the image or images from the database, and sends the request to the IR Engine; and wherein upon a response from the IR Engine, the attribute of the object or match no match response is stored in the database.

4. The system according to claim 1, wherein the jitter control module reads asset information from the database to determine if an asset is storing invalid status information during transit, the jitter control module determines if an asset is storing invalid status information when as asset responds its presence from multiple antenna simultaneously within one second; and wherein when such an event occurs, the jitter control module removes the entries, and stores the last entry detected into the database.

5. The system according to claim 1, wherein the software application further comprises an event module configured by the front end application module for setting up the event mode, and further the event module configured by the front end application module to send alert messages of missing assets, as per the selected alert setting, over the communication network.

6. The system according to claim 5, wherein the software application further comprises, wherein the front end application module configures the relay communication module to check status of and operate the relay switch.

7. The system according to claim 1, wherein the camera communication module sends the information to the server for storing the information including date and time information in the database.

8. The system according to claim 7, wherein the software application further comprises: a motion detector module for capturing images via the camera communication module when movement is detected and storing the images on the server.

9. The system according to claim 8, wherein the camera communication module stores visual data by time and date in the database.

10. The system according to claim 1, wherein the GPS communication module stores the location in the database.

11. The system according to claim 1, wherein the software application can be further expanded and include an unlimited number of modules.

12. The system according to claim 1, wherein the reader, server and software application are in one enclosure.

13. The system according to claim 1, wherein the reader, server and software application are in a handheld device.

14. The system according to claim 1, further optionally comprising a battery via a battery adapter to power the server which then powers the GPS unit, the camera, and the communication module.

15. The system according to claim 14, wherein the battery is configured to perform at least one of the functions selected from the group consisting of switching between direct current power and battery power, switching the system off when a predetermined temperature is reached, turning on a heater when battery power is too low, and informing the server when the system is powered by the battery.

16. A system for detecting information of assets stored in communication tags and communicating the assets information over a communication network, the system comprising:
    a bi-directional communication reader having at least one antenna with associated signal strength and antenna number, wherein the bi-directional communication reader processes the received assets information from the communication tags;
    a server having a database for storing asset information, wherein the server communicates with the hi-directional communication reader and stores the asset information using a software application;
    optionally at least one member of the group consisting of a camera operably connected to the server to generate visual data, a wireless communication unit operably connected to the server for providing bi-directional communication with the server, and an Image Recognition Engine to determine the attributes of an object within the image, or determine if two images are a match or no match based on the request from the event module;
    wherein the software application comprising:
        a front end application module to receive at least one operational mode from a user, wherein the operational mode relates to the setting of the operation of the bi-directional communication reader;
        an event module for reading the asset information from the database and alerting the user if a certain event occurs, the event module configured by the front end application module to set a specific rule that triggers an event;
        a back end application module configured via the front end application module, wherein the back end application module configures the bi-directional communication reader, as per the selected operational mode, to process the required information from the communication tags read by the bi-directional communication reader;
        a communication module for receiving processed assets information from the communication tags via the bi-directional communication reader having at least one antenna, wherein the communication module communicates the processed assets information over the communication network via a proprietary protocol; and
        optionally at least one member of the group consisting of a jitter control module reading the asset information from the database and removing the asset information when assets access a physical area that causes invalid reads; an IR communication module to receive events from the event module to request attributes based on an object within the image or a match no match response from the Image Recognition Engine, the attribute or match no match responses are then stored in the database; a camera communication module for processing information from the camera; and a reader control module to start and stop the back-end application module from running when motion is detected from a motion detector communication module;
        wherein the inclusion of the jitter control module, the IR communication module, the camera communication module, and reader control module is determined by the inclusion of the Image Recognition Engine, and the camera unit.

17. The system according to claim 16, wherein the motion detector communication module informs the reader control module that movement is detected, the reader control modules then starts the back-end application module via the front end application module to start transmitting and reading asset information; and wherein the reader control modules then stops the back-end application module via the front-end application module after a certain amount of time set by the user in the front end application module.

18. The system according to claim 16, wherein the event module requests the attribute or a match no match response of an object from the IR communication module based on a video file stored by date and time and event in the database, the IR communication module retrieves the image or images from the database, and sends the request to the IR Engine; and wherein upon a response from the IR Engine, the attribute of the object or match no match response is stored in the database.

19. The system according to claim 16, wherein the jitter control module reads asset information from the database to determine if an asset is storing invalid status information during transit, the jitter control module determines if an asset is storing invalid status information when as asset responds its presence from multiple antenna simultaneously within one second; and wherein when such an event occurs, the jitter control module removes the entries, and stores the last entry detected into the database.

20. A system for detecting information of assets stored in communication tags and communicating the assets information over a communication network, the system comprising:
  a bi-directional communication reader having at least one antenna with associated signal strength and antenna number, wherein the bi-directional communication reader processes the received assets information from the communication tags;
  a server having a database for storing asset information, wherein the server communicates with the bi-directional communication reader and stores the asset information using a software application;
  optionally at least one member of the group consisting of a GPS unit operably connected to the server, a relay switch operably connected to the server, a camera operably connected to the server to generate visual data, a wireless communication unit operably connected to the server for providing bi-directional communication with the server, and an Image Recognition Engine to determine the attributes of an object within the image, or determine if two images are a match or no match based on the request from the event module;
  wherein the software application comprising:
    a front end application module to receive at least one operational mode from a user, wherein the operational mode relates to the setting of the operation of the bi-directional communication reader;
    an event module for reading the asset information from the database and alerting the user if a certain event occurs, the event module configured by the front end application module to set a specific rule that triggers an event;
    a back end application module configured via the front end application module, wherein the back end application module configures the bi-directional communication reader, as per the selected operational mode, to process the required information from the communication tags read by the bi-directional communication reader;
    a communication module for receiving processed assets information from the communication tags via the bi-directional communication reader having at least one antenna, wherein the communication module communicates the processed assets information over the communication network via a proprietary protocol; and
    optionally at least one member of the group consisting of a GPS communication module for processing information received from the GPS unit to determine location of the server; a relay communication module to receive events from the event module; a jitter control module reading the asset information from the database and removing the asset information when assets access a physical area that causes invalid reads; an IR communication module to receive events from the event module to request attributes based on an object within the image or a match no match response from the Image Recognition Engine, the attribute or match no match responses are then stored in the database; a camera communication module for processing information from the camera; and a reader control module to start and stop the back-end application module from running when motion is detected from a motion detector communication module;
  wherein the inclusion of the GPS communication module, the relay communication module, the IR communication module, the camera communication module, and the reader control module is determined by the inclusion of the GPS unit, the relay switch, the Image Recognition Engine, and the camera unit.

* * * * *